United States Patent
Lendi

(10) Patent No.: US 11,975,367 B2
(45) Date of Patent: May 7, 2024

(54) PIPE CLEANING AND/OR PIPE INSPECTION NOZZLE INCLUDING EXTENSION SLEEVE

(71) Applicant: Enz Technik AG, Giswil (CH)

(72) Inventor: Christoph Lendi, Giswil (CH)

(73) Assignee: Enz Technik AG, Giswil (CH)

( * ) Notice: Subject to any disclaimer, the term of this patent is extended or adjusted under 35 U.S.C. 154(b) by 470 days.

(21) Appl. No.: 17/155,993

(22) Filed: Jan. 22, 2021

(65) Prior Publication Data

US 2021/0245207 A1    Aug. 12, 2021

(30) Foreign Application Priority Data

Feb. 7, 2020 (CH) ..................... 00139/20

(51) Int. Cl.
*B08B 9/04* (2006.01)
*F16L 55/28* (2006.01)
(Continued)

(52) U.S. Cl.
CPC ............... *B08B 9/04* (2013.01); *F16L 55/28* (2013.01); *F16L 2101/12* (2013.01); *F16L 2101/30* (2013.01)

(58) Field of Classification Search
CPC ....... B08B 9/04; B08B 9/0495; B08B 9/0433; B08B 9/0497; B08B 9/053;
(Continued)

(56) References Cited

U.S. PATENT DOCUMENTS

2015/0331136 A1* 11/2015 Tinlin ............... E21B 17/00
134/113
2016/0129458 A1* 5/2016 Lendi ............... B05B 3/06
188/267
(Continued)

FOREIGN PATENT DOCUMENTS

CH        699422 B1 * 3/2010 ............. B05B 3/003
DE  202014100229 U1 * 3/2014 ........... B08B 9/0495
(Continued)

OTHER PUBLICATIONS http://web.archive.org/web/20160605101907/https://www.kaercher.com/us/home-garden/application-tips/pipe-cleaning.html (Year: 2016).*

*Primary Examiner* — Joseph L. Perrin
*Assistant Examiner* — Irina Graf
(74) *Attorney, Agent, or Firm* — Paul D. Bianco; Fleit Intellectual Property Law

(57) ABSTRACT

In the case of a pipe cleaning and/or pipe inspection nozzle, an available camera module can be coupled to a plurality of pipe cleaning and/or pipe inspection nozzles in a simple and cost-efficient manner such that a secure reliable coupling of the electrical lines is attained. An extension sleeve is inserted, which includes a high-pressure line section having a sleeve loop contact. The sleeve loop contact is fastened in the extension sleeve with a sleeve insulator insert and runs so as to transition into an inner power/signal line within the extension sleeve all the way into an outlet section in the direction of the longitudinal axis. At least one outlet opening is recessed out of the outlet section, and the outlet section opens out into a coupling section, at which elements are provided so that the coupling section can be fastened to a camera adapter.

7 Claims, 2 Drawing Sheets

(51) Int. Cl.
*F16L 101/12* (2006.01)
*F16L 101/30* (2006.01)

(58) Field of Classification Search
CPC .......... B08B 2209/032; B08B 2209/04; B08B 9/027; F16L 55/28; F16L 2101/12; F16L 2101/30
See application file for complete search history.

(56) References Cited

U.S. PATENT DOCUMENTS

2016/0305891 A1* 10/2016 Olsson ..................... E03F 9/00
2017/0128989 A1* 5/2017 Olsson ................. B08B 9/0325
2020/0012182 A1* 1/2020 Warren .................. E03F 9/007

FOREIGN PATENT DOCUMENTS

| DE | 102018110056 A1 * | 10/2019 | ........... B08B 9/0433 |
| EP | 1147825 A1 * | 10/2001 | ............ B08B 9/049 |
| EP | 3326727 A2 * | 5/2018 | ......... B08B 9/0495 |
| EP | 3513877 A1 * | 7/2019 | ............ B05B 1/042 |
| JP | H11114513 A * | 4/1994 | ............... B08B 9/04 |
| WO | WO-2006127095 A1 * | 11/2006 | ......... B08B 9/0436 |
| WO | WO-2014000887 A1 * | 1/2014 | ......... B08B 9/0495 |

* cited by examiner

PIPE CLEANING AND/OR PIPE INSPECTION NOZZLE INCLUDING EXTENSION SLEEVE

TECHNICAL FIELD

The present invention describes a metallic extension sleeve for installation in an interior space of a pipe cleaning nozzle and/or inspection nozzle, a pipe cleaning nozzle and/or inspection nozzle, comprising a metallic nozzle body comprising at least one feed nozzle and at least one cleaning nozzle, wherein a camera module is connected by means of a camera adapter, which is partially inserted into an interior space in the nozzle body, to an electrical conductor conducting electrical voltage and/or data signals in the connection region of a high-pressure hose to the pipe cleaning nozzle and/or inspection nozzle, and the use of an extension sleeve in the interior space of a pipe cleaning nozzle and/or inspection nozzle.

BACKGROUND

Various pipe cleaning nozzles, which are used to remove dirt and deposits from inner walls of pipes, ducts, and shafts, by application with a pressure medium, are known for cleaning pipes, ducts, and shafts. The feed and the cleaning effect is attained by the application with pressure medium. The inspection during and in particular after the cleaning also became technically possible recently, which enables many customers to watch videos of cleaned pipes, ducts, and shafts. The quality control of the cleaning is thus easily possible.

As is shown in FIGS. 1A and 1B, pipe cleaning and/or inspection nozzles in the form of so-called pulling nozzles are known from the prior art. FIG. 1A shows a stationary pipe cleaning nozzle comprising a stationary nozzle body, to which a high-pressure hose can be fastened on a first side, and a camera module can be fastened on a second side, which are in each case suggested drawn in a dashed manner in FIG. 1B. The cabling of the camera module by means of cables, which are guided in the edge region of the high-pressure hose, is adapted to the length of the nozzle body.

FIG. 1B shows a rotating pipe cleaning nozzle, consisting of a multi-part nozzle body comprising a pushing part, a rotor part, and a stator part, which forms the head of the pipe cleaning nozzle. Pressure medium can also be supplied from a rear side by means of a high-pressure hose, and can be discharged through at least one feed nozzle, as a result of which the feed and the rotation of the pipe cleaning nozzle is accomplished. A camera module can in each case be attached on the side of the nozzle body located opposite the high-pressure hose in the longitudinal direction, whereby an electrical cabling is attained as well.

Due to the fact that the common camera modules require a power supply and usually a cable-based transfer of the video signals, it is often still problematic to ensure a permanently secured and reliable cable connection. In addition, the available pipe cleaning nozzles and/or inspection nozzles have different lengths in the longitudinal direction and they are not standardized. To date, a coupling of the current-carrying and/or signal-carrying electrical lines is only possible by means of camera adapters, which are produced specifically for the type of the nozzle. Every nozzle requires a camera adapter adapted to its lengths in the longitudinal direction, which is not shown in FIGS. 1A and 1B. Due to the fact that, to date, the different lengths of the nozzle bodies has led to the use of camera adapters of different designs, high costs resulted and the susceptibility to errors was increased as well, because the use of incorrect camara adapters occurred again and again in practice.

SUMMARY OF THE INVENTION

The above-described disadvantages, which are known from the prior art, are to be eliminated by the present device.

One aspect of the present invention relates to creating a possibility that an available camera module can be coupled to a plurality of pipe cleaning and/or inspection nozzles in a simple and cost-efficient manner, and that a secure reliable coupling of the electrical lines is attained.

A metallic extension sleeve is disclosed herein, whereby a pipe cleaning and/or inspection nozzle comprising the features as disclosed herein can be attained. The use of extension sleeves of this type is also disclosed.

Variations of feature combinations or slight adaptations of the invention, respectively, can be found in the detailed description, are shown in the figures, and have been added into the claims.

BRIEF DESCRIPTION OF THE DRAWINGS

The subject matter of the invention will be described in detail below in connection with the enclosed drawings.

DETAILED DESCRIPTION

Figure 1A:
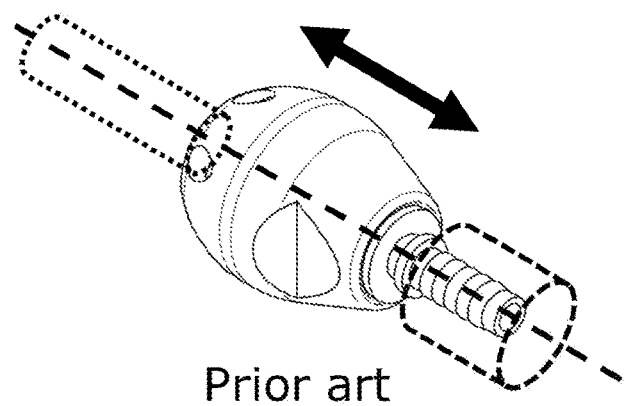
FIG. 1A shows a partially schematic perspective view of a pulling nozzle comprising camera module from the prior art.
Figure 1B:
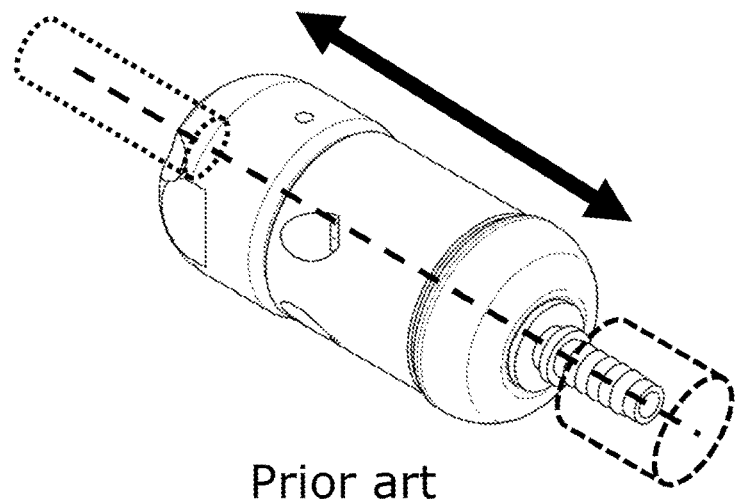
FIG. 1B shows a partially schematic perspective view of a rotary nozzle known from the prior art comprising camera module and classic line guide.
Figure 2:
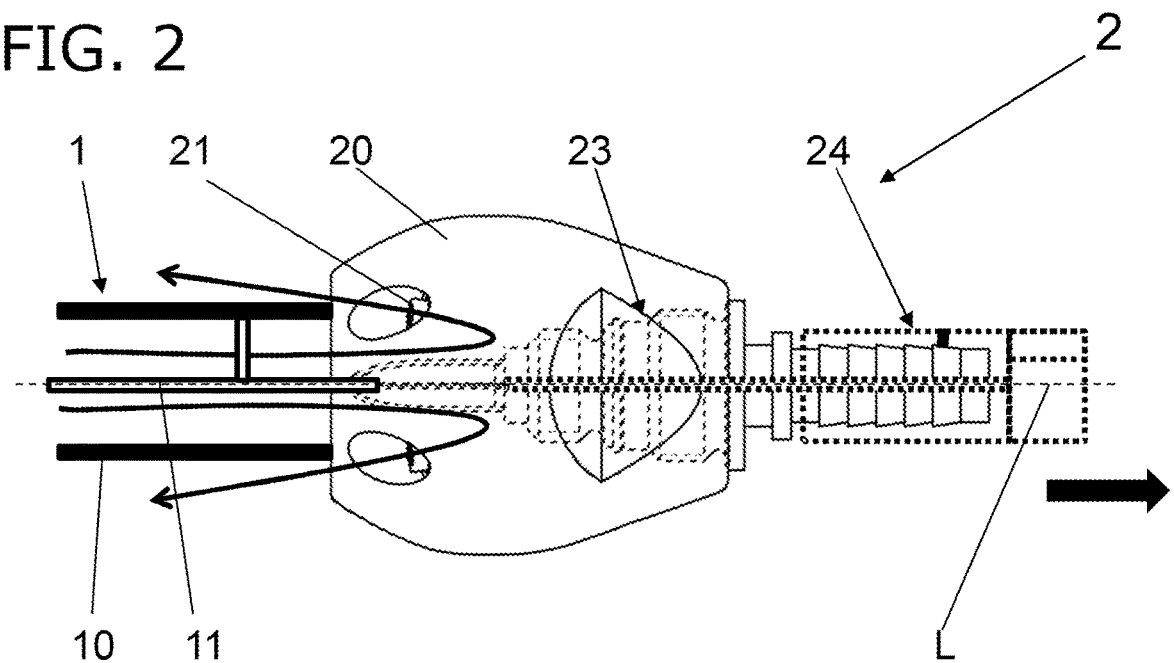
FIG. 2 shows a partially cut schematic side view of a pulling nozzle comprising a camera adapter and a camera module, wherein an extension sleeve is not necessary, because the length of the camera adapter is adapted to the length of the pulling nozzle.
Figure 3:
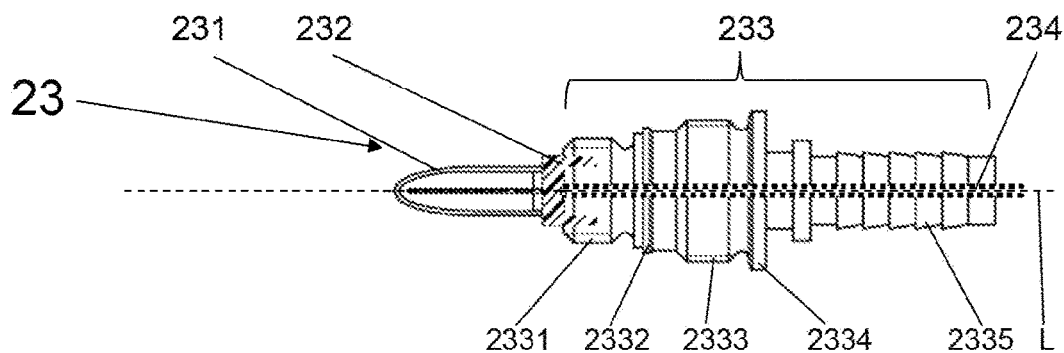
FIG. 3 shows a schematic partially cut side view of the camera adapter according to FIG. 2.

The pipe cleaning nozzles and/or inspection nozzles 2 of interest here have at least one nozzle body 20, to which a high-pressure hose 1 can be connected. By means of at least one feed nozzle 21, the pipe cleaning nozzle and/or inspection nozzle 2 can be moved parallel to the longitudinal axis L in the feed direction, as suggested by means of the black arrow. A camera adapter 23, to which a camera module 24 can be fastened directly or indirectly, is arranged in an interior space, to which pressure medium can be applied. The camera module 24 is supplied with energy from the hose wall 10 with electrical contact and/or electrical conductors 11 through the high-pressure hose 1, or data signals from the camera module 24 are guided away from the pipe cleaning nozzle and/or inspection nozzle 2, respectively. The camera adapter 23 or the length thereof, respectively, is adapted to the length of the pulling nozzle 2 in FIG. 2.

To ensure a cabling, which is free from short-circuits, the camera adapter 23 has, on its high-pressure hose-side end, a loop contact 231, which is formed something like a whisk here. The loop contact 231 is fastened to a metallic adapter body 233 by means of an insulator insert 232. An inner power line/signal line 234 is connected to the insulator insert 232, electrically connected to the loop contact 231 and protruding through an interior space of the adapter body 233 in a camera module direction. Electrical power and/or data signals can thus be guided all the way into a camera module 24, accepted by the loop contact 231. The length of the camera adapter 23 in the direction of the longitudinal axis L is adapted to a pulling nozzle 2 or the corresponding nozzle body 20, respectively.

The adapter body 233 is made of metal and has, consecutively in the direction of the longitudinal axis L, a first external thread 2331, a stop 2332, a second external thread 2333, a flange 2334, and a sleeve 2335. The camera adapter 23 is fastened in the interior space of the nozzle body 20 or in the interior space of a stator part 202, respectively, by means of the second external thread 2333. The camera module 24 is screwed or attached to the sleeve 2335, which protrudes later, and the camera module 24 is contacted with the inner power/signal line 234. So that no short-circuits occur in response to the fastening to the nozzle body 20, an electrical insulation has to exist between loop contact 231 and the inner power/signal line 234. The stop 2332 can be forgone, whereby the thread diameters of the first external thread 2331 and second external thread 2333 have to be different. The diameter in the region of the first external thread 2331 has to be smaller than the diameter of the second external thread 2333. The flange 2334 serves the purpose that the camera adapter 23 cannot be sunk too far in the interior space of the nozzle body 20. A screw connection between camera adapter 23 and nozzle body 20 is advantageous, although a plug connection would likewise be possible.

Figure 4:
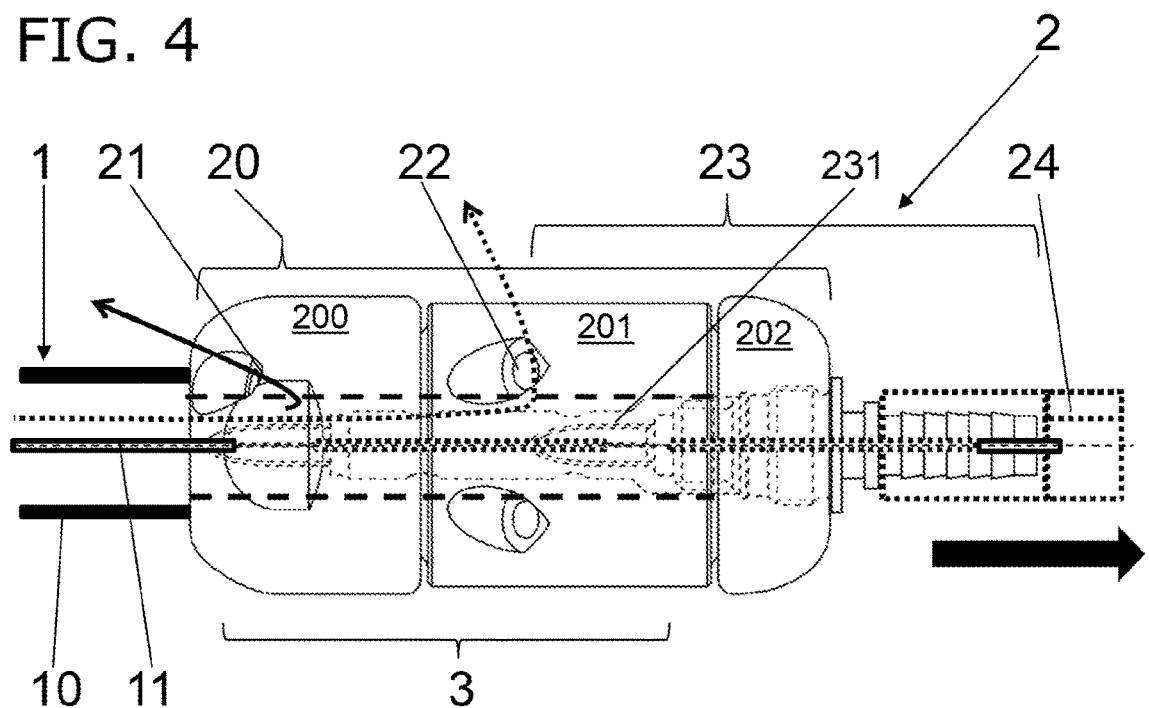
FIG. 4 shows a partially cut schematic side view of a multipart pipe cleaning and/or inspection nozzle in the form of a rotating nozzle comprising camera module, wherein, in addition to the camera adapter, an extension sleeve is arranged so as to run concentrically to the interior space of the rotating nozzle.
Figure 5:
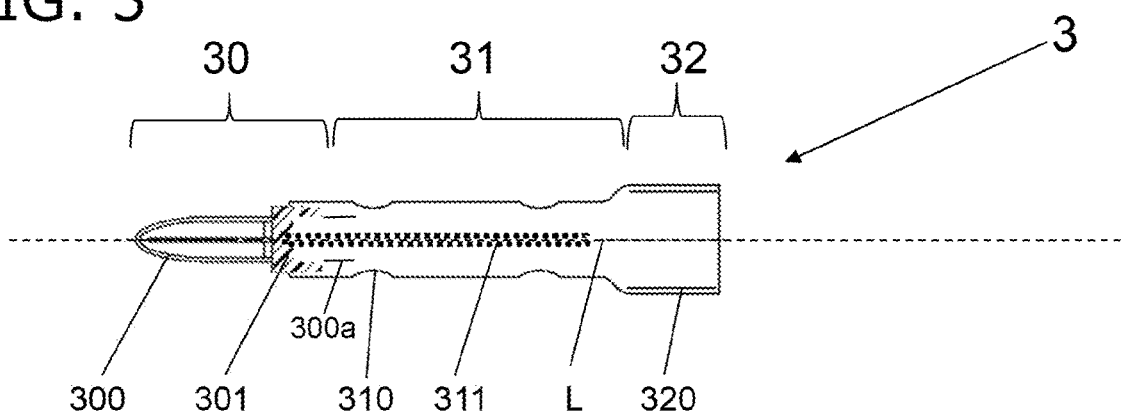
FIG. 5 shows a schematic partially cut side view of the extension sleeve according to FIG. 4.

If a pipe cleaning nozzle and/or inspection nozzle 2 with different length of the nozzle body 20 is now used, as shown in FIG. 4, the camera adapter 23 can then no longer supply the desired cabling between high-pressure hose 1 and camera module 24. The nozzle body 20 comprises a pushing part 200, a rotor part 201, and a stator part 202. The camara adapter 23 or the loop contact 231 thereof, respectively, can no longer be contacted directly with the electrical contact 11 in the high-pressure hose 1.

A modular setup comprising camera adapter 23 and an extension sleeve 3 is introduced here. Due to the extension sleeve 3, which is fastened to the camera adapter 23 by means of a screw connection, an electrical conductor 11, which is oriented towards the nozzle 2 on the high-pressure hose side, can be contacted indirectly via the extension sleeve 3 and the camera adapter 23 comprising the camera module 24.

Different camera adapters 23 of different lengths, which are produced in a rather complex manner, do not need to be used for nozzles 2 or nozzle bodies 20, respectively, of different lengths, but the extension sleeve 3 is available in different lengths and can be variably installed. The extension sleeve 3 is installed into the interior space of the pipe cleaning nozzle and/or inspection nozzle 2 and is fastened indirectly therein. A non-positive and/or positive respectively a form-fitting and/or force-locking connection of the extension sleeve 3 with the camera adapter 23 is provided in the nozzle body 20. Whereby the camera adapter 23 is likewise fastened in a positive and/or non-positive respectively in a form-fitting and/or force-locking manner in the interior space of the nozzle body 20, so that the connections can be released if necessary.

In its course, the extension sleeve 3 has a high-pressure line section 30, an outlet section 31, and a coupling section 32.

The high-pressure line section 30 comprises a sleeve loop contact 300, which can likewise be designed as sleeve whisk, and a sleeve insulator insert 301. The sleeve loop contact 300 comprises one or several bent wire loops, which are electrically conductive. The sleeve insulator insert 301 is embedded into the extension sleeve 3 and ensures an electrical insulation of the sleeve loop contact 300 and of at least one centric inner power/signal line 311 with respect to the extension sleeve 3. In the installed state, the centric inner power/signal line 311 transfers electrical voltages and/or data signals to the loop contact 231 of the camera adapter 23.

Along the outlet section 31, at least one outlet opening 310 is provided in the extension sleeve 3, through which pressure medium can be discharged from the interior space radially to the outside from the nozzle 2. Depending on the design of the nozzle 2, the pressure medium is guided to the outside through at least one feed nozzle 21 and/or cleaning nozzle 22. Due to the fact that the extension sleeve 3 is arranged in the interior space, a centric duct in the nozzle 2, which guides pressure medium, pressure medium is accordingly guided through the interior of the extension sleeve 3.

The diameter of the high-pressure line section 30 and of the outlet section 31 is selected to be smaller than the diameter of the coupling section 32 here. The extension sleeve 3 is partially pushed over the camera adapter 23 and is preferably fastened in a screwed manner. An attaching and a clamping fastening of the extension sleeve 3 with the coupling section 32 thereof to the camera adapter 23 on the side thereof facing the high-pressure hose are likewise possible.

The coupling section 32 preferably has a coupling internal thread 320, by means of which the coupling section 32 and thus the extension sleeve 3 is screwed onto the camera adapter 23. In the installed state, the electrically conductive extension sleeve 3 is connected in an electrically conductive manner to the camera adapter 23 and the stator part 202 and thus in an electrically conductive manner to the nozzle body 20. In the case of a clamping connection between coupling section 32 and camera adapter 23, the coupling internal thread 320 can be forgone. The core, thus the inner power/signal line 311 is contacted in an electrically conductive manner with the inner power/signal line 234 of the camera adapter 23, and the inner power/signal line 311 and the inner power/signal line 234 are arranged in an electrically insulated manner with respect to the nozzle body 20, the camera adapter 23, and the extension sleeve 3.

The extension sleeve 3 is made of steel, aluminum, or of brass. The sleeve insulator insert 301 is likewise formed in a sleeve-like manner, comprising a smaller cross section than the high-pressure line section 30 of the extension sleeve 3. The electrically insulating material of the sleeve insulator insert 301 can be ceramic or plastic. The sleeve loop contact 300 is fastened in the sleeve insulator insert 301 and is connected to the inner power/signal line 311, for example by means of soldering. An electrical connection of the sleeve loop contact 300 and the inner power/signal line 311 to the body of the extension sleeve 3 is thus ruled out.

In the region of the high-pressure line section 30, the extension sleeve 3 is designed with a smaller cross section than in the remaining regions of the extension sleeve 3 and thus in a tapered manner. In a further development, an external thread 300a is provided at the outer surface of the high-pressure line section 30. A further extension sleeve 3 can be screwed onto the first extension sleeve 3 by means of the tapering and the external thread 300a. An interior space of any length of a nozzle 2 can thus be bridged by several extension sleeves 3, wherein a power supply and/or data connection from the high-pressure hose side all the way to the camera module 24 is possible.

Even if pressure medium flows through the interior space of the nozzle 2, in which the extension sleeve 3 is located, and escapes through a cleaning nozzle 22, as suggested by means of dashes in FIG. 4, the camera module 24 can be supplied with power and/or data signals can be accepted.

REFERENCE LIST 1 high-pressure hose
   10 hose wall with electrical contact
   11 electrical conductor through high-pressure hose/in hose wall
2 pipe cleaning nozzle and/or inspection nozzle
   20 nozzle body
      200 pushing part
      201 rotor part
      202 stator part/head
   21 feed nozzle (at least 1)
   22 cleaning nozzle (at least 1)
   23 camera adapter
      231 loop contact/whisk
      232 insulator insert/loop holder
         233 adapter body
         2331 first external thread
         2332 stop
         2333 second external thread
         2334 flange
         2335 sleeve
      234 inner power/signal line
   24 camera module
3 extension sleeve (for camera adapter)
   30 high-pressure line section
      300 sleeve loop contact/sleeve whisk
      300a external thread
      301 sleeve insulator insert
   31 outlet section (centrically)
      310 outlet opening
      311 inner power/signal line
   32 coupling section
      320 coupling external thread
L longitudinal axis

The invention claimed is:

1. A metallic extension sleeve installable in an interior space of a nozzle body of at least one of a pipe cleaning nozzle and a pipe inspection nozzle, the metallic extension sleeve comprising a high-pressure line section having a sleeve loop contact,
wherein the sleeve loop contact is fastened in a positive locking screw connection in the metallic extension sleeve by a sleeve insulator insert, and the sleeve loop contact transitions into an inner power/signal line arranged within the metallic extension sleeve in an outlet section in a direction of a longitudinal axis of the metallic extension sleeve,
wherein at least one outlet opening is recessed in the outlet section, and the outlet section opens into a coupling section,
wherein fastening elements are arranged such that the coupling section is configured for fastening in a positive locking screw connection to a camera adapter, and a cross section of the coupling section is larger than a cross section of the outlet section and the cross section of the outlet section is larger than a cross section of the high-pressure line section,
wherein the fastening elements comprise a coupling thread,
wherein an external thread is arranged on an outer surface of the metallic extension sleeve at least partially along the high-pressure line section,
wherein the coupling thread is configured for engagement with an external thread of a second extension sleeve, and
wherein a distal end of the inner power/signal line is configured to contact a sleeve loop contact of the second extension sleeve when the coupling thread is engaged with the external thread of the second extension sleeve.

2. The metallic extension sleeve according to claim 1, wherein the inner power/signal line runs centrically within the metallic extension sleeve such that the inner power/signal line is electrically insulated from an outer wall of the metallic extension sleeve.

3. The metallic extension sleeve according to claim 1, wherein the coupling thread is arranged at the coupling section of the metallic extension sleeve.

4. The metallic extension sleeve according to claim 1, wherein the metallic extension sleeve is composed of brass and the sleeve insulator insert is composed of electrically insulting plastic or ceramic.

5. The metallic extension sleeve according to claim 1, wherein the sleeve loop contact is electrically connected by soldering to the inner power/signal line.

6. A nozzle for at least one of pipe cleaning or pipe inspection comprising a metallic nozzle body having at least one feed nozzle and at least one cleaning nozzle, wherein a camera module is configured for connection to the camera adapter, the camera adapter partially inserted into an interior space in the metallic nozzle body, to an electrical conductor conducting at least one of an electrical voltage and a data signal in a connection region of a high-pressure hose to the nozzle, wherein at least one metallic extension sleeve according to claim 1 is arranged between the camera adapter and a high-pressure hose-side end of the metallic nozzle body through the interior space in the metallic nozzle body.

7. A nozzle for at least one of pipe cleaning and pipe inspection comprising the metallic extension sleeve according to claim 1, wherein the metallic extension sleeve is positioned in the interior space of the body of the nozzle and configured for contacting an electrical conductor via the camera adapter through the interior space of the body of the nozzle, wherein a camera module is arranged outside of the body of the nozzle, and wherein the metallic extension sleeve bridges a length of the body of the nozzle and is releasably fastened with the coupling thread to the camera adapter.

* * * * *